United States Patent [19]

Houk et al.

[11] 4,191,064
[45] Mar. 4, 1980

[54] LEVER CONTROL

[75] Inventors: Richard D. Houk, Stow; Marvin H. Jones, Wooster, both of Ohio

[73] Assignee: Samuel Moore and Company, Aurora, Ohio

[21] Appl. No.: 890,132

[22] Filed: Mar. 27, 1978

[51] Int. Cl.² .................... G09F 9/00; G05G 1/04
[52] U.S. Cl. .................................... 74/475; 74/476; 74/491; 74/538; 116/28.1; 116/DIG. 20
[58] Field of Search .............. 74/475, 476, 538, 491; 116/28.1, DIG. 20

[56] References Cited

U.S. PATENT DOCUMENTS

| | | | |
|---|---|---|---|
| 2,255,663 | 9/1941 | Hansen | 116/288 X |
| 2,671,425 | 3/1954 | Schneider | 116/DIG. 20 |
| 2,672,116 | 3/1954 | Gunderson | 116/DIG. 20 |
| 2,672,117 | 3/1954 | Morphew | 116/DIG. 20 |
| 2,738,756 | 3/1956 | Doane | 116/DIG. 20 |
| 3,871,244 | 3/1975 | Gressard | 74/491 |
| 3,998,109 | 12/1976 | O'Brien | 74/538 X |
| 4,126,054 | 11/1978 | Langford et al. | 74/475 |
| 4,137,864 | 2/1979 | Lauper | 116/DIG. 20 |

*Primary Examiner*—Allan D. Herrmann
*Attorney, Agent, or Firm*—Hamilton, Renner & Kenner

[57] ABSTRACT

A lever control for an engine transmission and the like having a transverse shaft secured in spaced frame plates and a face plate or cover traversing the outer edges of said spaced plates. A handle lever extends through the face plate and is connected to a control actuator plate rotatable on the shaft, and a detent operable from the handle lever is biased to normally engage selectively in a notched positioning gate mounted on one of said frame plates. An arcuate housing enclosing the gate and detent is mounted on the handle lever extending through the face plate. A preferred embodiment has a visual indicator showing the control positions which is illuminated to be visible day and night.

8 Claims, 5 Drawing Figures

LEVER CONTROL

BACKGROUND OF THE INVENTION

Certain prior controls known to us for automatic and hydrostatic transmissions, hydraulic valves and other equipment have the lever handle extending through an open slot in the face plate so that the internal mechanism of the control is not sealed, and there is no position indicator which is illuminated so as to be visible at night. Exemplary of such controls is that disclosed in U.S. Pat. No. 3,871,244, which has a stepped open slot for positioning the lever handle extending therethrough. Such positioning means is somewhat uncertain and relies on external lighting and feel at night. The open slot does not seal off the inner mechanism from weather and atmospheric conditions.

SUMMARY OF THE INVENTION

The present invention is designed to overcome the disadvantages of prior constructions and provide a simple and compact lever control construction.

More specifically, it is an object of the present invention to provide a lever control which has a positive detent positioning means fully enclosed within a movable housing surrounding the control lever.

Another object is to provide illuminated visual indicator means, visible day or night, for indicating the positions of the control lever.

A further object is to provide a detent mechanism which ratchets from one extreme position to neutral, but requires a secondary yielding release to pass from neutral to the opposite extreme position.

Another object is to provide an improved detent pin which rotates to distribute wear.

A still further object is to provide an improved lever control which is easily adapted for various industrial and vehicle applications involving alternate detent and ratchet arrangements, friction braking of the actuator plate, safety and back-up switches, and the like.

These and other objects are accomplished by the improvements comprising the present invention, a preferred embodiment of which, exemplary of the best known mode of practicing the invention, is shown in the accompanying drawings and described in the following specification. Various modifications and changes in details of construction are comprehended within the scope of the appended claims.

DESCRIPTION OF PREFERRED EMBODIMENT

Figure 1:
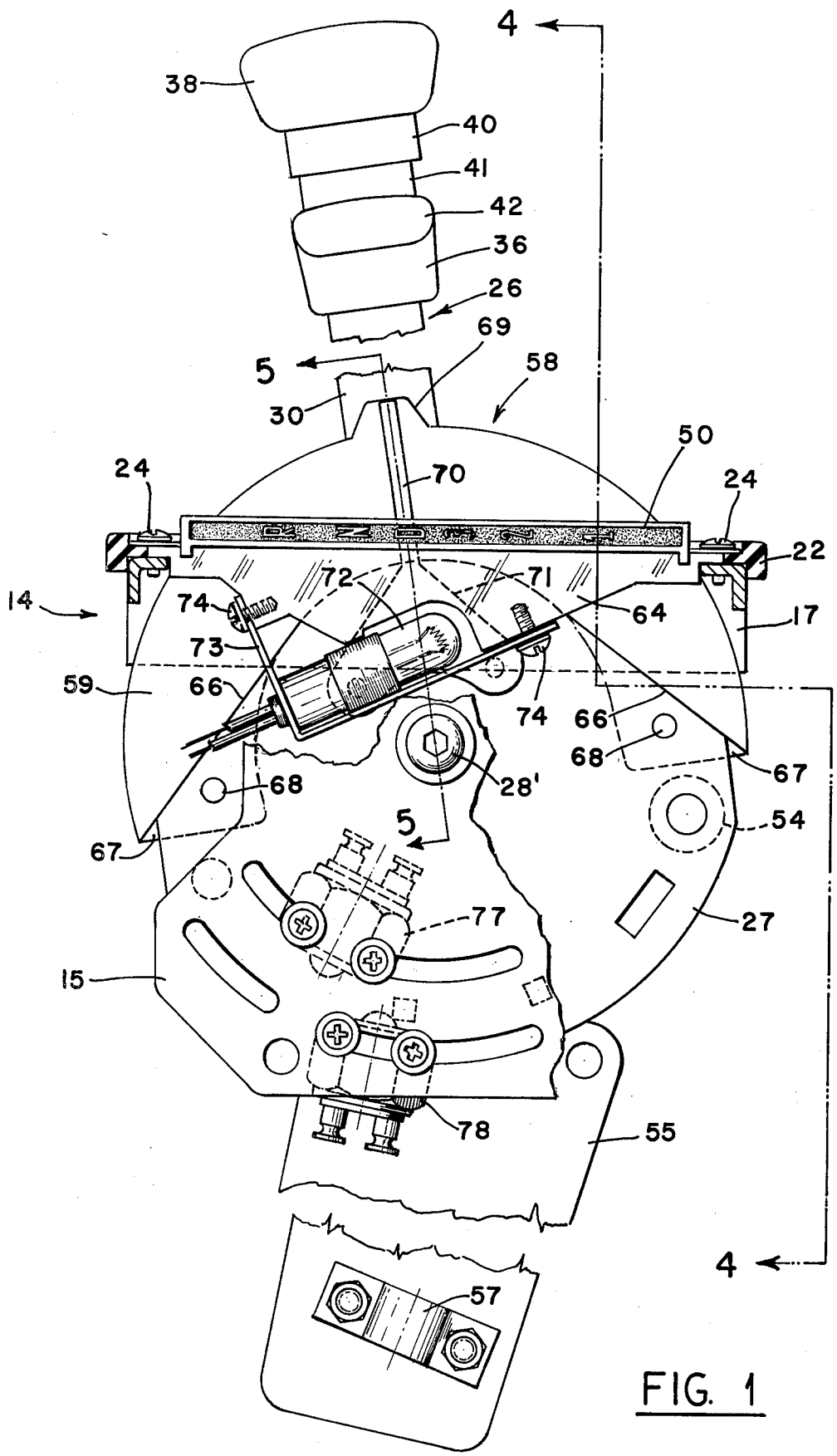
FIG. 1 is a side elevation, with parts broken away and in section, of a preferred embodiment of our improved lever control, as on line 1—1 of FIG. 4.

Referring to FIGS. 1–5, the lever control has a frame or chassis indicated generally at 14 comprising two parallel spaced-apart mounting plates 15 and 16 having reinforcing bars 17 secured to and extending along their sides at one end. Between the bars 17 the plates 15 and 16 are provided with inturned flanges 19 and 20, respectively, and a recessed slotted flexible cover seal 21 traverses the flanges 19 and 20 and has an outer rim portion 22 engaging over the edges of bars 17 and 18. Preferably, a slotted cover plate 23 is secured to the recessed portion of cover seal 21 by screws 24 extending through the flanges 19 and 20.

The chassis 14 is adapted to fit into an opening in a control panel or the like conveniently accessible to the operator of a vehicle or other equipment which is operated by the improved lever control.

Figure 5:
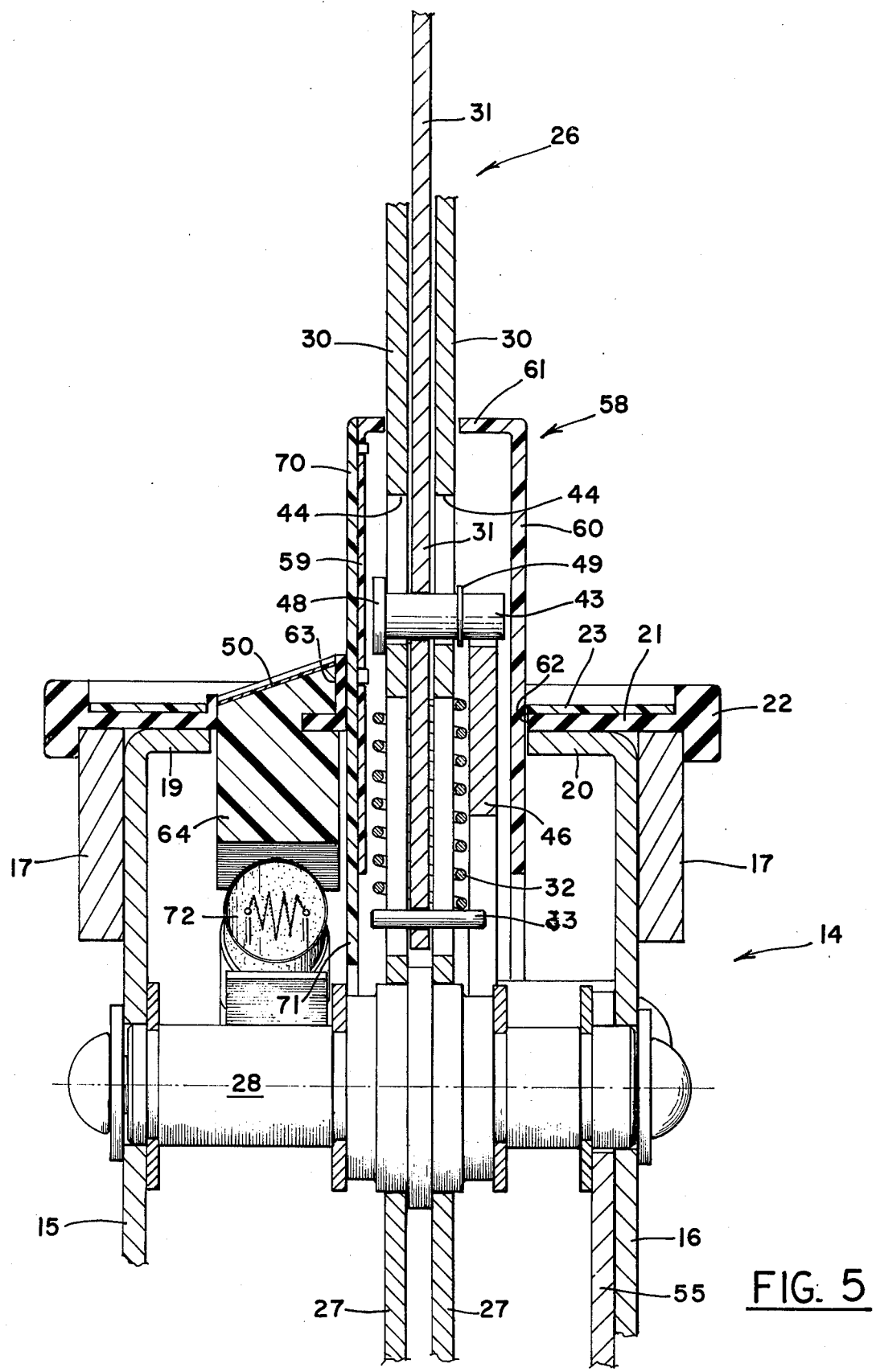
FIG. 5 is an enlarged partial sectional view as on line 5—5 of FIG. 1.

The handle lever indicated generally at 26 extends through the cover plate 23 and cover seal 21 and between the flanges 19 and 20 and is connected to a pair of actuator plates 27 pivotally mounted on a transverse shaft 28 secured at its ends in the mounting plates 15 and 16 by screws 28'. Preferably, the handle shaft is rectangular in cross section and has two spaced-apart side bars 30 with a narrow detent-operating bar 31 mounted for longitudinal sliding movement between the side bars (FIG. 5). The side bars 30 may be integral with actuator plates 27. A compression spring 32 encircles the reduced inner end portion of the bar 31 and is retained against shoulders in the side bars by a pin 33 traversing the inner end of the bar.

Figure 3:
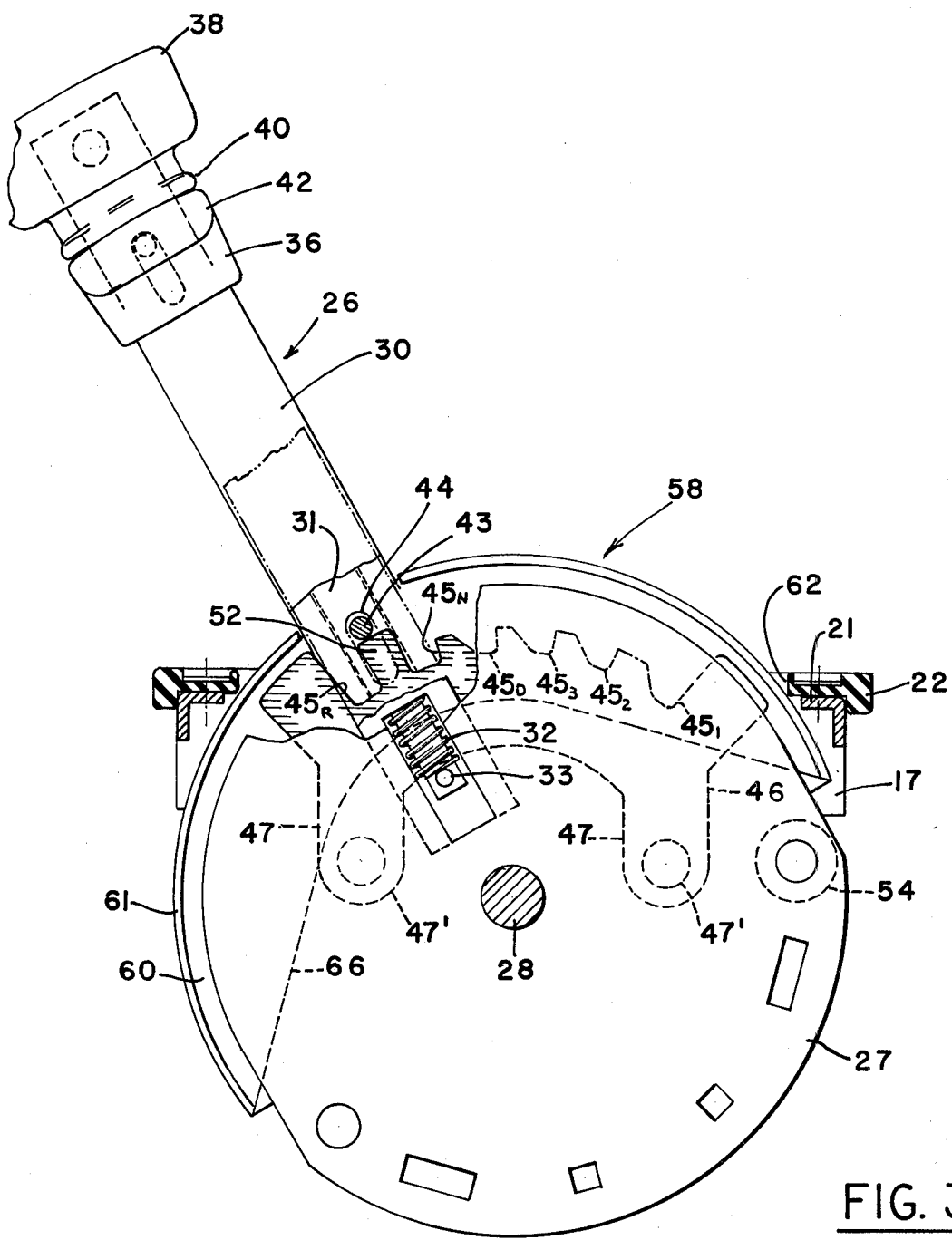
FIG. 3 is a similar view showing the handle between neutral and reverse positions.

The outer end of bar 31 has a transverse pin 34 secured therein which extends through slots 35 in the handle side bars 30 and has its outer ends secured in a finger piece 36 slidable on the handle shaft. The movement of the finger piece is thus limited by engagement of pin 34 with the ends of slots 35. A palm-abutting knob 38 is secured on the outer end of the handle shaft by a pin 39 and has a tubular resilient collar 40 surrounding the shaft and slidably receiving the collar portion 41 of finger piece 36. The laterally projecting portion 42 of finger piece 36 is positioned to abut collar 40 before the pin 34 reaches the outer ends of slots 35, thus requiring compression of the resilient collar 40 in order to move the pin 34 into the outer ends of the slots, as indicated in FIG. 3. The purpose of this construction will be hereinafter described.

Figure 2:
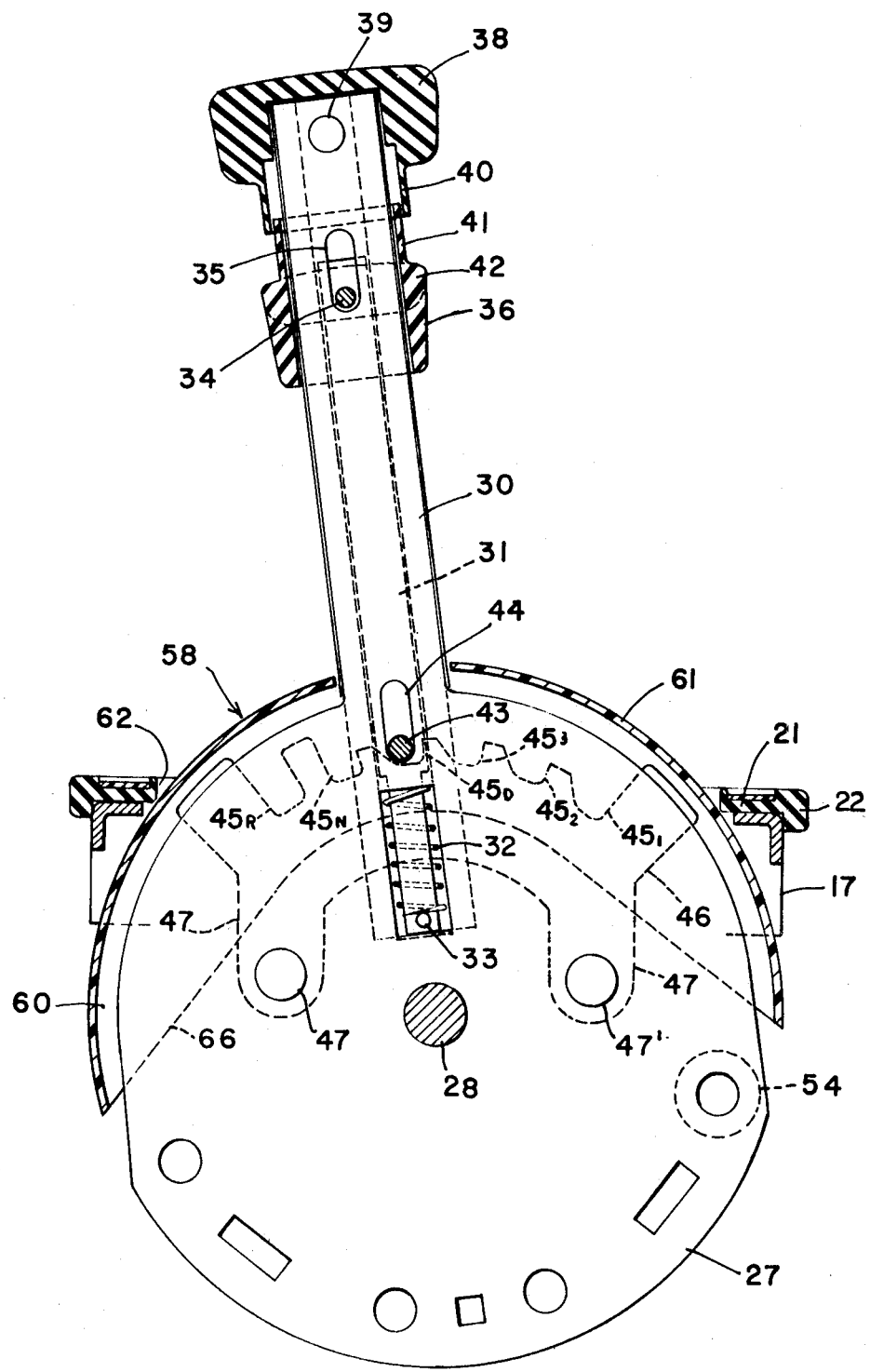
FIG. 2 is a vertical sectional view as on line 2—2 of FIG. 4, showing the handle in drive position.

Adjacent to its reduced inner end portion the bar 31 has a transverse detent pin 43 therein slidable in longitudinal slots 44 in handle side bars 30 which are the same length as slots 35. The detent pin 43 is biased by the spring 32 to engage selectively in notches or indentations 45 arranged in series in the edge of a gate plate 46 mounted adjacent to and parallel with the actuator plates 47. As shown in FIGS. 2 and 3, the gate plate 46 may have inner tongue-like projections 47 which are secured by posts 47' to one of the mounting plates, preferably plate 16, to rigidly mount the gate plate closely adjacent to one of the actuator plates 27.

As shown in FIG. 5, the pin 43 is rotatable in the bar 31 while being held against axial movement in slots 44 by a flange 48 at one end abutting one of the side bars 31 and a retaining ring 49 abutting the other side bar. This construction reduced wear on the pin 43 by allowing it to rotate as it is moved from one notch to another.

The gate plate 46 is adapted for remote control of an automatic engine transmission by connecting the actuator plates to the transmission controls by means of a push-pull cable linkage (not shown) and the notches 45 are correlated to the various positions in the transmission range. As shown, notch $45_R$ is the reverse position, notch $45_N$ is neutral, notch $45_D$ is drive or high speed, and notches $45_3$, $45_2$, and $45_1$ are three lower speed positions. As seen in FIG. 1 these positions are shown on the control position scale 50 on the face plate as R, N, D, 3, 2, and 1, respectively.

Referring to FIGS. 2 and 3, it will be noted that the left side of each of the notches $45_D$, $45_3$, $45_2$ and $45_1$ have radially disposed right edges and inclined left edges whereas both right and left edges of notches $45_R$ and $45_N$ are radially disposed. Also, the tooth formed between notches $45_R$ and $45_N$ is substantially longer than the teeth between notches $45_N$ and $45_3$, $45_2$ and $45_1$. This construction allows the operator with his palm against knob 38 to shift from notch $45_N$ to any of the notches $45_D$ to $45_1$ by squeezing the finger piece 36 sufficiently to lift the detent pin 43 against the pressure of spring 32 to clear the intervening short teeth. This movement of pin 43 as well as pin 34 is less than the length of the respective notches 44 and 35. The inclined edges of the notches permit the pin 43 to ratchet over the intervening teeth in the reverse direction to the $45_N$ notch without squeezing the finger piece.

However, in order to shift the pin 43 from notch $45_N$ into notch $45_R$ or vice versa, it is necessary to lift the pin 43 through the full extent to slot 44 in order to clear the intervening tooth 52, as shown in FIG. 3. This requires sufficient additional squeezing of the finger piece 42 to abut and compress the resilient collar 40 of the knob 38. With the finger piece released the control mechanism can not be shifted accidentally to reverse or to any lower range. Obviously, the outer edges of notches $45_R$ and $45_1$ are sufficiently long to limit movement of pin 43 beyond the range of the series of notches.

The width of all of the notches provides some lost motion of the pin 43 in each position which allows the operator to feel the seating of corresponding detents in the transmission through the push-pull cable linkage. As shown in the drawings, the actuator plates are provided with several peripheral perforations for selective attachment to the rod end of a push-pull cable core, a threaded connector plug 54 being mounted at one such location. A cable conduit hanger plate 55 may be secured to shaft 28 and to the inner surface of mounting plate 16 by bolts 56 and extending downwardly therefrom. A clamping bracket 57 is mounted on the extended portion of plate 55 for mounting a fitting secured to the cable conduit enclosing the cable core.

An important feature of the improved lever control is the provision of an arcuate clamshell-shaped housing enclosing the detent mechanism and the coacting notches of the gate plate in all positions. This housing is indicated generally at 58 and has side plates 59 and 60 connected by an arcuate or circumferential edge plate 61 circumscribed about the shaft 28 as a center. The side plates 59 and 60 pass slidably through a slot 62 formed in the cover seal plate 21, one side of the slot being formed by a resilient gasket 63 abutting the edge of a block 64 of acrylic material which has the well-known property of transmitting light. The scale 50 is adhered to the upper inclined surface of the block and has translucent indicia for transmitting the light from the block 64.

The side plates 59 and 60 straddle the upper portions of the actuator plates 27 and the notches portion of plate 46, and the inner edges of the side plates have cutaway edges 66 so as to clear the posts 47' as the housing is rotated. Ribs 67, parallel to and between the side plates 59 and 60, extend from the edge plate 61 at the inner edge portions of the housing into the space between the actuator plates 27 and said ribs are secured to the actuator plates by screws 68.

The shaft of handle 26 extends through the edge plate 61 at a central portion thereof where a trapezoidal projection 69 is formed therein. In side plate 59 a radial slot is formed extending from the outer edge of projection 69 to the inner edge of plate 59. An indicator bar 70 of acrylic material having the characteristic of transmitting light according to well-known "pipe" effect is mounted in said radial slot, and from the inner edge of plate 59 the bar 70 widens into a substantially triangular portion 71 which overlies the adjacent actuator plate 27 and is pivoted thereto at its lower ends.

A light bulb 72 is mounted under the block 64 and laterally adjacent triangular portion 71 by means of an angular bracket 73 attached to the block 64 by screws 74. Thus, light from the bulb 72 is transmitted through the block 64 to the indicia on scale 50, and through the triangular portion 71 and indicator bar 70 as the handle assembly including the housing 58 is rotated. The underside of bar 70 is etched to provide illumination of the bar along its exposed length.

Figure 4:
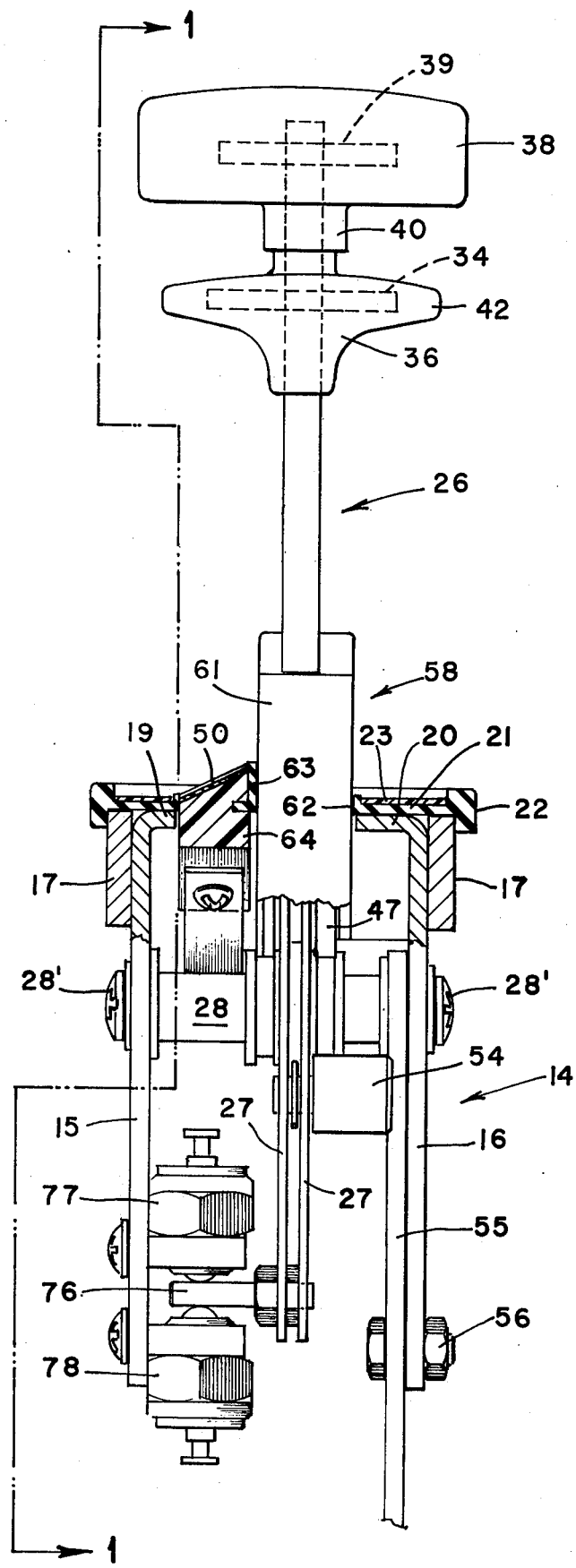
FIG. 4 is a view partly in elevation and partly in section, as on line 4—4 of FIG. 1.

Referring to FIGS. 1 and 4, a switch pin 76 may be mounted on the periphery of the actuator plates 27 so as to actuate safety switches 77 and 78 mounted selectively at predetermined locations in slots in side mounting plate 15. Such switches may for example control starting of the engine only in neutral position and actuate a back-up warning signal.

In the operation of the improved control, assuming the control frame is rigidly mounted in a panel or bracket support in the operator's compartment and the bulb is connected to a light source, the operator has at all times an illuminated indicator and illuminated position indicia cooperating therewith. A relatively gentle squeeze on the finger piece allows easy shifting from neutral position to and from drive and any lower speed position and, if desired, ratcheting from a lower speed to the neutral position without squeezing the finger piece. To get into or out of the reverse position, the operator must squeeze hard on the finger piece in the manner previously described.

It will be observed that the face plate construction provides an acoustic, dust and dirt seal between the operator's compartment and the control mechanism, because the clamshell housing slidably abuts the edge gaskets provided by the resilient cover seal and at the edge of the acrylic light block.

The improved lever control construction is flexible and easily adapted to different transmission position requirements by changing gate plates, and to different detent and ratchet mechanisms.

We claim:

1. Lever control mechanism comprising a frame having spaced-apart mounting plates and a substantially flat cover plate traversing the outer ends of said plates, a transverse shaft secured in said mounting plates, a control plate rotatable on said shaft, a handle lever connected to said control plate and extending through said cover plate, a gate plate having a series of indentations secured to one of said mounting plates, a detent slidable on said lever and biased to engage selectively in said indentations, and an arcuate channeled housing attached to said lever extending movably and outwardly through and in sealed relation to said cover plate and enclosing said gate and detent mechanism.

2. Lever control mechanism as defined in claim 1, wherein said notches allow the detent pin to ratchet from the notch at one end of said series to the next to last notch at the other end, and means on the handle lever yieldingly resisting sliding of said detent pin on said lever to allow said pin to ratchet into said last notch.

3. Lever control mechanism as defined in claim 1, wherein the exterior of said cover plate has a control position scale thereon and the exposed portion of said housing carries a cooperating visual indicator.

4. Lever control mechanism as defined in claim 2, wherein means for illuminating said scale and visual indicator is mounted on the inside of said cover plate.

5. Lever control mechanism as defined in claim 4, wherein the visual indicator is a linear transparent material extending within the cover plate and adapted for transmitting light from an interior light source to the exposed portion of the visual indicator.

6. Lever control mechanism as defined in claim 1, wherein the indentations are notches and the detent is a pin biased to engage selectively in said notches and rotatably mounted in an actuator bar slidable on said handle lever, and bar sliding means is mounted on the exposed portion of said lever.

7. Lever control mechanism as defined in claim 6, wherein a second control plate is spaced from and parallel to said first control plate and the actuator bar is slidably mounted between the control plates, a biasing pin is mounted in the inner end of said actuator bar, and a biasing spring is interposed between said biasing pin and said control plates.

8. Lever control mechanism as defined in claim 6, wherein said notches allow the detent pin to ratchet from the notch at one end of said series to the next to last notch at the other end, and means on the handle lever yieldingly resisting sliding of the actuator bar to allow the detent pin to ratchet into said last notch.

* * * * *

UNITED STATES PATENT AND TRADEMARK OFFICE
CERTIFICATE OF CORRECTION

PATENT NO. : 4,191,064

DATED : March 4, 1980

INVENTOR(S) : Richard D. Houk and Marvin H. Jones

It is certified that error appears in the above-identified patent and that said Letters Patent are hereby corrected as shown below:

Column 2, line 50, "47" should read --27--.

Column 2, line 59, "reduced" should read --reduces--.

Column 3, line 23, "to", first occurrence, should read --of--.

Column 3, line 63, "notches" should read --notched--.

Column 5, line 10, "claim 2" should read --claim 3--.

Signed and Sealed this

Twenty-fourth Day of June 1980

[SEAL]

Attest:

SIDNEY A. DIAMOND

Attesting Officer

Commissioner of Patents and Trademarks